United States Patent [19]

House

[11] Patent Number: 5,022,170

[45] Date of Patent: Jun. 11, 1991

[54] WORK SURFACE INFORMATION DISPLAY PAD

[75] Inventor: V. Dean House, Orem, Utah

[73] Assignee: Data Pad Corporation, Orem, Utah

[21] Appl. No.: 135,653

[22] Filed: Dec. 21, 1987

Related U.S. Application Data

[63] Continuation-in-part of Ser. No. 15,945, Feb. 18, 1987.

[51] Int. Cl.[5] .............................................. B43M 3/00
[52] U.S. Cl. ...................................... 40/358; 40/649; 281/45
[58] Field of Search ................ 40/356, 358, 359, 649, 40/642, 661, 530, 374, 375, 159, 158.1, 405, 611, 391; 312/231; 248/205; 33/1 B, 1 A; 281/45, 82, 44, 31; 428/13, 14; 211/45, 89; 340/710; 273/148 R; 434/88, 410

[56] References Cited

U.S. PATENT DOCUMENTS

| 443,205 | 12/1890 | Galle | 40/358 |
|---|---|---|---|
| 1,037,607 | 9/1912 | Floto | 40/1 |
| 1,180,750 | 4/1916 | Wolf | 40/642 |
| 1,214,785 | 2/1917 | Hill | 33/1 B |
| 1,379,134 | 5/1921 | Steddom | 312/231 |
| 1,406,838 | 2/1922 | Fox | 281/45 |
| 1,421,975 | 7/1922 | Meyers | 273/148 R |
| 1,465,244 | 8/1923 | Hager | 40/649 |
| 1,528,400 | 3/1925 | Busch | 40/530 |
| 1,631,192 | 6/1927 | Dunlap | 434/410 |
| 1,934,497 | 11/1933 | Grove | 40/374 |
| 2,096,559 | 10/1937 | Riley | 40/158.1 |
| 2,142,843 | 1/1939 | Harris | 40/159 |
| 2,573,323 | 10/1951 | Eshelman | 281/44 |
| 2,999,332 | 9/1961 | Stein | 40/615 X |
| 3,983,277 | 9/1976 | Ackerman et al. | 428/13 |
| 4,083,137 | 4/1978 | Rozmanith | 40/158.1 |

FOREIGN PATENT DOCUMENTS

| 193345 | 11/1957 | Austria | 40/649 |
|---|---|---|---|
| 1134991 | 4/1957 | France | 40/405 |
| 2261883 | 9/1975 | France | 40/375 |

Primary Examiner—James R. Brittain
Assistant Examiner—J. Hakomaki

[57] ABSTRACT

A pad for covering a work surface comprising a thin transparent cover over a base layer. A portions of the cover is secured to the base layer so that the balance of the cover is liftable upwardly therefrom to receive and retain between the cover and the base layer sheet materials bearing visual information of utility to a user. The information is then visible to the user through the transparent cover. Alternatively, the cover may be attached to the base layer so as to produce therebetween a pouch opening at an edge of the pad to receive such sheet materials. The top surface of the cover can optionally be textured to provide a substitute work surface upon which to write or operate a computer mouse. The bottom surface of the base pad is textured to prevent slipping of the device on the work surface.

8 Claims, 3 Drawing Sheets

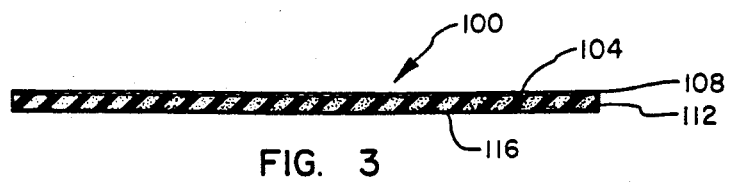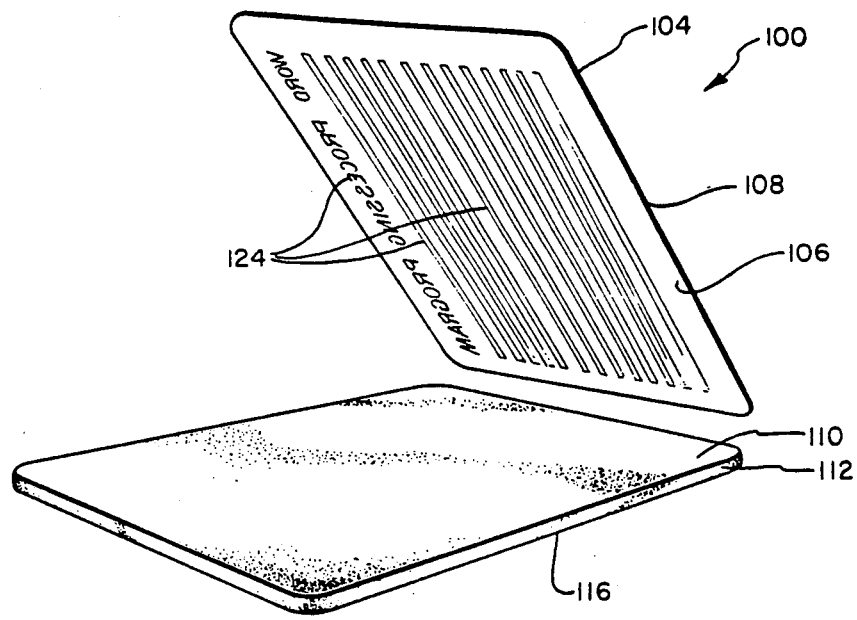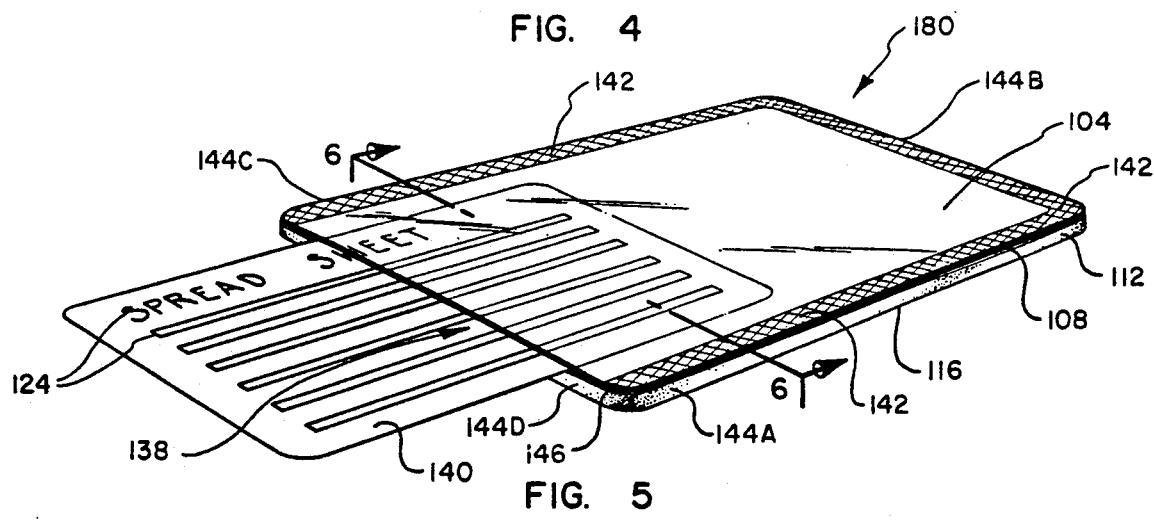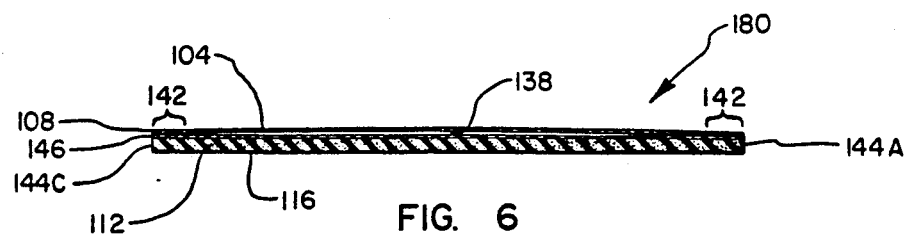

WORK SURFACE INFORMATION DISPLAY PAD

RELATED APPLICATIONS

This is a continuation-in-part application of U.S. patent application No. 015,945 filed on Feb. 18, 1987 now U.S. Pat. No. 4,799,054.

BACKGROUND OF THE INVENTION

1. Field of the Invention

This invention relates to pads for placement on a work surface to display information on sheet material that is removably installed therein, and more particularly to such pads which also optionally afford a surface on which written or other manual work can be undertaken.

2. Background

Many activities occur on a work surface, such as a desk, table, or countertop. Frequently, the quality of the activity involved renders it desirable that the work surface be covered with a substitute work surface that has physical qualities better in harmony with that activity than are the physical qualities of the work surface itself. The substitute work surface may be flatter, softer, less uneven, quieter, less slippery, less unsightly, or even more visually informative than the original work surface.

An example of such a work surface covering is the traditional desk pad, which affords its user a writing surface having enhanced traction, fewer irregularities, and better writing cushion than does the top of the desk with which it is used. This improves the ease and quality of the handwritten work produced thereon Similar considerations dictate the use of mats as writing surfaces at check-out counters in retail enterprises, at application windows in agencies and government offices, and at teller gates in banking establishments. Much concern is accordingly expended on insuring that it is easy and effective to use writing implements on the work surfaces at these types of locations.

In another vein, many engineering, scientific, and business work places are equipped with computer terminals. Often these have display screens upon which the position of a cursor is controlled by the operation on an adjacent work surface of a hand-held device called a mouse. As shown in FIG. 1, a typical mouse 10 has a generally mound-like body 14 to be grasped by the user and a control cable 32 connected to a computer. As can be seen in FIG. 1, mouse 10 includes a track ball 28, which makes contact with and rolls upon a work surface 12 upon which mouse 10 is to be operated. The rotational movement of the track ball 28 is converted into a corresponding electrical signal by the rotation of rollers 22, which are mounted on driving shafts 26 and which in turn drive potentiometers 16 by way of interconnecting gears 18 and 20. Potentiometers 16 convert the rotational movement of track ball 28 into a proportional electrical signal.

If mouse 10 is to be used effectively, the linear movement of mouse 10 across work surface 12 must be accurately translated into the rotational movement of the track ball 28. This can be frustrated when work surface 12 includes imperfections, such as dents and cracks 34 shown in FIG. 1. If work surface 12 is imperfect, the desired one-to-one relationship between linear movement of mouse 10 and the rotational movement of track ball 28 cannot be maintained. Dusty, dirty, wet, or uneven work surfaces will cause similar undesirable results. In an effort to overcome problems associated with work surfaces upon which mouse-type controllers are operated, work surface coverings have been developed upon which to operate such controllers. These have generally been termed mouse operating pads.

The use of desk pads and mouse operating pads on work surfaces has, however, lead to the further insight that in addition to the utility just described, such work surface coverings have the potential of being able to display information having repeated utility at the work place involved. For example, calendars tables maps, and personnel directories are frequently imprinted on desk pads, while computer commands and data base telephone access numbers are found on mouse operating pads. In many instances advertising is also included, and pads bearing such are supplied without charge for promotional purposes. While the potential capacity of desk pads and mouse operating pads to display information has added to the utility of such work surface coverings, the permanent imprintation of visual information thereon limits the flexibility with which pads of this sort can be adopted to maximum benefit by different workers.

Heavy sheets of glass have been used on work surfaces to retain and protect personalized bits of memorabilia and reference sheet material, while simultaneously providing a substitute work surface. Items of sheet material held in place in this manner are, however, most difficult or impossible to remove or rearrange conveniently. Further, the substitute work surface provided by glass is considered by many to lack physical characteristics compatible with the effective operation of writing implements or computer mouse controllers thereupon.

In an effort to afford personalized, changeable information display capacity to work surface coverings, desk pads have in some instances been provided with or comprised of sheets of writing material, such as blotters or paper, on which individual notations of importance to the user may be inscribed. Many of these individual notations, however, are embodied on detached articles of sheet material which are retained in the vicinity of or upon the work surface for easy reference, but which can become difficult to locate or even lost through commingling with papers at the desk. Some desk pads are provided with raised borders under which such sheet material can be inserted, but as such borders are opaque, the information contained on such sheet material is frequently obscured once inserted. To avoid this result, the sheet material is left protruding from beneath the border where it can yet be inadvertently damaged or displaced by the other activities performed on the desk pad.

SUMMARY OF THE INVENTION

One object of the present invention is to produce a work surface covering which provides a substitute work surface and which in addition is capable of displaying to a user of the work surface information individualized thereto.

Another object of the present invention is a work surface covering capable of conveniently displaying such information when it is imprinted on sheet material.

Yet another object of the present invention is an information display pad as described above which precludes the destruction, displacement, or degradation of such sheet material and which affords easy access thereto for rearrangement purposes.

It is a further object of the present invention that an information display pad as described above not slip upon the work surface whereat it is used, but can be readily relocated at the option of the user.

Additional objects and advantages of the invention will be set forth in the description which follows, and in part will become apparent from that description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an information display pad for use on a work surface is provided comprising a flat transparent cover mounted on top of a resilient base layer which isolates the upper layer from unevenness in the work surface upon which the pad is placed. The bottom surface of the base layer is designed to firmly grip the work surface on which it is used, and the upper surface of the cover can be provided with such texturing as is considered optimal to the environment in which the pad is used. Thus the inventive information display pad has utility both as a desk pad and as a mouse operating pad.

The cover is attached to the base layer in such a manner as to permit visual information, such as advertising or reference matter, imprinted on sheet material to be inserted between the cover and the base layer and thereafter viewed through the transparent cover. The cover may be attached to the base layer by bonding along three of its edges, or in any other suitable pattern, in order to create between the cover and the base layer one or more pockets into which information-bearing sheet material may be removably inserted.

Alternatively, the cover and base layers may be secured one to another along a single common edge. In this manner portions of the cover remote from that common edge can be lifted away from the upper surface of the base layer to permit the insertion and easy rearrangement of sheet material carrying visual information.

In one preferred embodiment of the present invention, three-way hinge means are provided for attaching the cover to the base layer and permitting the cover to be lifted away from the base layer at opposed-side edges and the included edge closest to a user. The hinge means of this embodiment comprises an attachment site at which the cover is secured to the base layer. The attachment site forms a region located at a medial position on one edge of the top surface of the base layer.

Optionally the upper surface of the base layer can be imprinted with visual information or graphic designs apprehendable through the cover layer. Also the cover layer itself can be provided with such visual information or with an erasable writing surface upon which to make temporary notations.

BRIEF DESCRIPTION OF THE DRAWINGS

In order that the manner in which the above-recited and other advantages and objects of the invention are obtained, a more particular description of the invention briefly described above will be rendered by reference to the specific embodiments thereof which are illustrated in the appended drawings. It should be understood that these drawings depict only typical embodiments of the invention and are, therefore, not to be considered limiting of its scope. The invention will, thus be described with additional specificity and detail through use of the following drawings in which:

FIG. 3 is a cross-sectional elevation view of the mouse operating pad of FIG. 2 taken along section line 3—3 shown therein;

FIG. 4 is an exploded perspective view of a second embodiment of a mouse operating pad;

FIG. 5 is a perspective view of a first embodiment of an information display pad according to the present invention and taking the form of a mouse operating pad;

FIG. 6 is a cross-sectional elevation view of the information display pad of FIG. 5 taken along section line 6—6 shown therein;

DETAILED DESCRIPTION OF PREFERRED EMBODIMENTS OF THE INVENTION

In the following description of preferred embodiments, like structures will be referred to by like numerals throughout.

Figure 1:
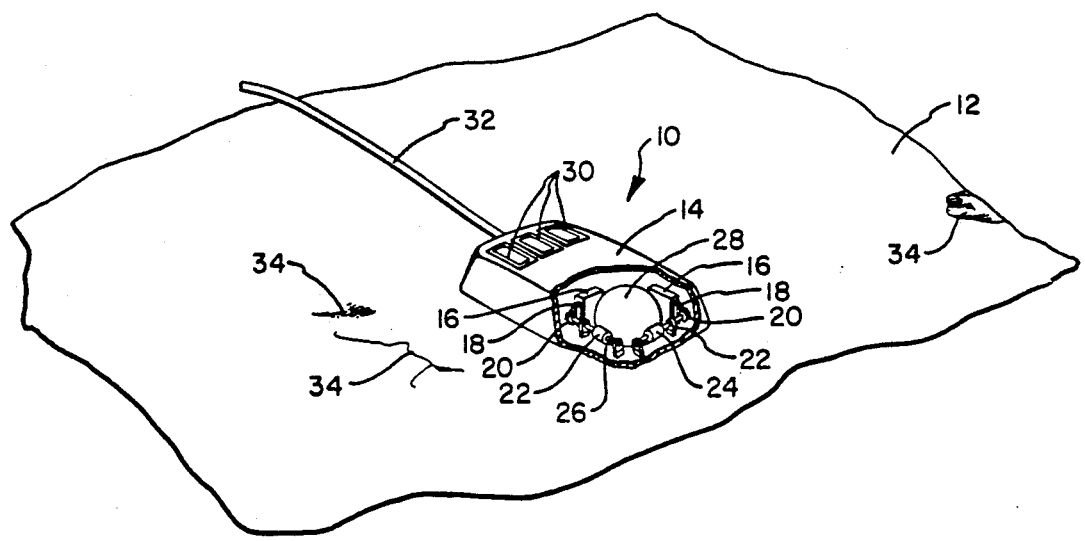
FIG. 1 is a partially cutaway perspective view of a typical mouse device useable with various embodiments of the present invention.
Figure 2:
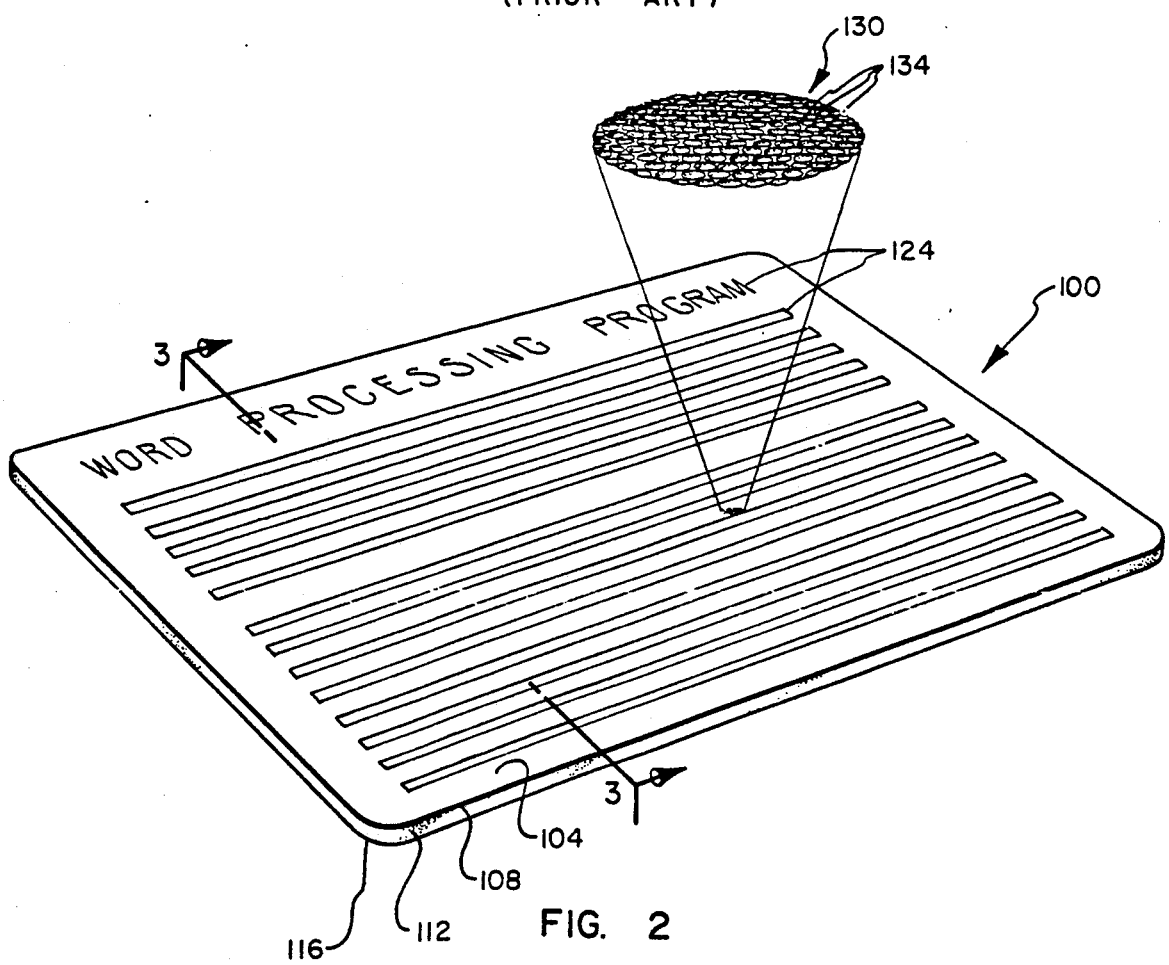
FIG. 2 is a perspective view of one embodiment of a mouse operating pad with limited information display capacity, including an enlarged detail showing the texture of the substitute work surface thereof.

One embodiment of a mouse operating pad 100 helpful ultimately in understanding the present invention is illustrated in FIGS. 2 and 3. Mouse operating pad 100 includes a cover 108 having a substitute work surface 104 formed on the top surface thereof, and a base layer 112 upholding cover 108 and having a gripping surface 116 on the side opposite from cover 108. Cover layer 108 and base layer 112 are separately formed and attached using an adhesive or other means. In use, mouse pad 100 is placed on a work surface 12 shown in FIG. 1, with substitute work surface 104 upward. Gripping surface 116 of base layer 112 thus contacts work surface 12. Lettering 124 shown in FIG. 2 is intended to represent one type of visual display which can be permanently imprinted on such a mouse pad.

A material suitable for cover 108 is polyvinyl chloride, such as that produced by Goss Plastics Film Corp. of Los Angeles, Calif. under the Goss 48.4 trade name. This material is available in thicknesses ranging from 10 to 20 mils. It is provided as well with texturing on one surface which affords a desirable mouse operating or writing surface. Other materials which serve for cover 108 include textured polycarbonate materials available either from General Electric Company of Pittsfield, Mass. under the trademark LEXAN ®, or from any of Mobay Chemical Corporation, Plastics Division, of Pittsburgh, Pa., Rohm & Haas Co. of Philadelphia, Pa., and Humko Shefield Chemical of Memphis, Tenn. Polystyrene, polyester, and acetate films or scratch-resistant vinyl may also be used.

Substitute work surface 104 can best be described as having a continuous uniform random texture. As shown in the enlarged section 130 of substitute work surface 108 shown in FIG. 2, one embodiment incorporates a matte surface texture. The matte surface texture generally comprises a great number of plateau-like protrusions 134 scattered at random on the surface, each having a top at the same level. The spaces between the protrusions 134 must be small compared to the surface area of the tracking member which contacts substitute work surface 104. Many other textures, such as velvet textures, could be incorporated into substitute work surface 104. A material having a glossy or smooth surface can be textured or patterned toward this end with ultraviolet radiation, solvent-based inks, or other known methods.

The hardness of cover 108 is in the range of about 70 durometer to about 140 durometer, when measured on the "A" durometer scale, with a hardness of 90 durometer being preferred. It may be beneficial to provide cover 108 material with anti-static properties, and optionally the cover 108 may be transparent.

Base layer 112 may be formed from 0.20-inch thick neoprene closed cell sponge rubber or other suitable material. For example, open cell neoprene sponge rubber, natural sponge rubber (both open and closed cell), vinyl sponge, and EPDM (ethelene, propylene, diene, terpolymer) sponge are among the materials that can also be used for base layer 112. For want of any other ready designation, these and similarly structured materials suitable for use as base layer 112 will be referred to herein and in the claims that follow as "resilient sponge materials".

The hardness of base layer 112 is such as to preclude cover 108 from deforming unacceptably due to mouse operation, or even writing, thereon. Base layer 112 is comprised of a material having a hardness in the range of about 20 durometer to about 70 durometer when measured on the "A" durometer scale.

Base layer 112 may be formed from 0.20-inch thick neoprene closed cell sponge rubber or other suitable material. For example, open cell neoprene sponge rubber, natural sponge rubber (both open and closed cell), vinyl sponge, and EPDM (ethelene, propylene, diene, terpolymer) sponge are among the materials that can also be used for base layer 112.

It is important to the proper functioning of mouse operating pad 100 that substitute work surface 104, and thus cover 108, be as flat as possible. Thus, base layer 112 is interposed between cover 108 and work surface 12 so that any imperfections or anomalies, such as protrusions or depressions, found on work surface 12 are isolated from substitute work surface 104. The type, thickness, and rigidity of the material used for control surface 108 will all have a bearing on the hardness to be designed into intermediate layer 112. If intermediate layer 112 is too hard or to thin, imperfections in work surface 12 may not be isolated from substitute work surface 104. If base layer 112 is comprised of a material which is overly hard, anomalies, such as ridges in work surface 12, may be manifest in substitute work surface 104. Conversely, if base layer 112 is overly soft, the ability to use substitute work surface 108 effectively may be impaired.

Base layer 112 is provided with a gripping surface 116 on the side thereof opposite from cover 108. Gripping surface 116 allows base layer 112 to engage work surface 12 in a nonslip fashion. A "cross hatch" texture, can accomplish this purpose. FIG. 3 shows the relationship between cover 108, upon which is formed substitute work surface 104, and base layer 112, upon which is formed gripping surface 116. Base layer 112 may usefully also be provided with anti-static properties.

To attach cover 108 to base layer 112, adhesives may be used such as those manufactured by Minnesota Mining and Manufacturing Co. (for example 3M9721 and 3M9472), by Adchem of Westbury, N.Y. (for example MSC2AT, MSC3AT, MSC4AT, or MSC5AT), by Morgan Adhesive Co. of Artesia, Calif., or by the Fasson Group of Avery Internation Corp. of Pasadena, Calif.

An important feature of mouse operating pad 100 is the incorporation thereinto of informative visual displays which are apprehendable by a user. Such visual information may be applied to substitute work surface 104 itself, or as shown in FIG. 4, to the lower surface 106 on the opposite side of the cover 108. By incorporating a visual message on lower surface 106, rather than on substitute work surface 104, difficulties can be avoided that arise due to the message being worn off or due to the printing associated therewith interfering with the operation of track ball 28. It has been found useful to add adhesion enhancers to the inks used for printing on lower surface 106 of cover 108.

As mentioned above, it is also desirable to facilitate removable installation of information on sheet material. Another first embodiment of an information display pad 180 that incorporates teachings of the present invention is illustrated in FIGS. 5 an 6 comprising a cover 108 and a base layer 112. Cover 108 is secured to base layer 112 at an attachment site 142 located along three of the peripheral edges 144A, 144B, and 144C thereof. A pouch 138 is thus formed between cover 108 and intermediate layer 112, and sheet material 140 with information 124 displayed thereon can be inserted into pouch 138 through an opening at peripheral edge 144D of base layer 112 where the cover 108 is not attached thereto. As will be appreciated, any suitable means for forming the pouch 138 may be used, as for example attachment at two opposite edges, or even attachment of cover 108 to two adjacent edges.

Pouch 138 is expandable, due to the fact that all of the materials of which it is formed are flexible. This allows for easy insertion of sheet material 140. In pad 180, cover 108 must be comprised of a transparent material in order that the information on sheet material 140 inserted into pouch 138 can be visible.

In information display pad 180 a sheet material support layer 146 is interposed between base layer 112 and cover 108. Sheet material support layer 146 may be an opaque glossy material. Any of the materials previously described for use as control layer 108 which are also available with a glossy surface, may be used as sheet material support layer 146. Support layer 146 provides a nonfrictional surface which wll ease insertion and removal of sheet material 140 into pouch 138. It should be understood that whether or not a layer, such as support layer 46, is interposed between cover 108 and base layer 112, base layer 112 functions to uphold cover 108 and substitute work surface 104 thereon above the work surface upon which pad 180 is placed.

The materials and method of manufacture described earlier in relation to mouse operating pad 100 are appropriate information display pad 180 also. An aesthetically enhanced information display pad results when sheet material support layer 146 is opaque. Sheet material support layer 146 has a thickness of about 10 mils. The adhesives described earlier can be used to adhere sheet material support layer 146 to base layer 112 and to adhere portions of the perimeter of cover 108 to sheet material support layer 134 at attachment site 142.

Figure 7:
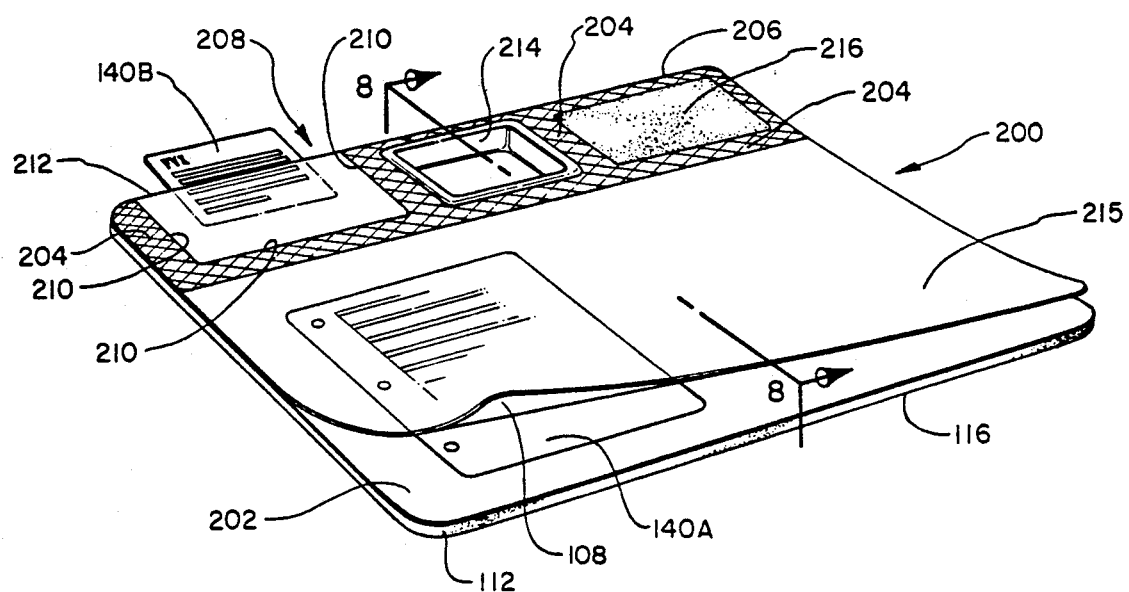
FIG. 7 is a perspective view of a second embodiment of an information display pad according to the present invention and taking the form of a desk pad.
Figure 8:
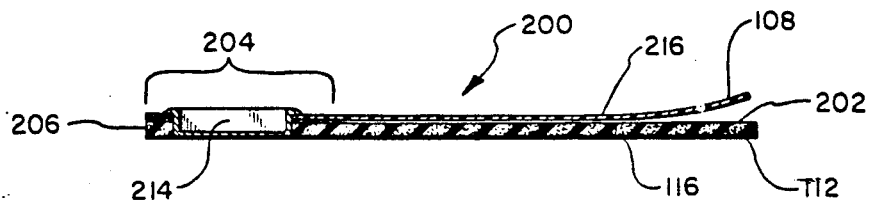
FIG. 8 is a cross-sectional elevation view of the information display pad of FIG. 7 taken along section line 8—8 shown therein.

Still another embodiment of an information display pad 200 taking the form generally of a desk pad is shown in FIG. 7. Information display pad 200 comprises base layer 112 having a lower surface 116 designed to rest against work surface 12 in frictional engagement therewith. A cover 108 that is transparent is upheld by base layer 112 resting against upper surface 202 thereof.

In accordance with one aspect of the present invention, a work surface cover, such information display pad 200, is provided with hinge means for attaching transparent cover 108 to base layer 112 while enabling portions of transparent cover 108 to be lifted away from upper surface 202 of base layer 112 temporarily to receive sheet material 140A therebetween.

As shown by way of example and not limitation, transparent cover 108 is secured to base layer 112 at an attachment site 204 on base layer 112. Attachment site 204 comprises a region located adjacent one edge 206 of base layer 112. The portion of cover 108 at attachment site 204 is bonded to base layer 112 Thus cover 108 and base layer 112 cannot be completely separated. Nevertheless, portions of cover 108 remote from attachment site 204 can be lifted away from upper surface 202 of base layer 112 for the purpose of receiving sheet material 140A between base layer 112 and cover 108. Visual information on sheet material 140A is then visible to a user through cover 108.

Information display pad 200 further includes a pouch 208 formed between cover 108 and base layer 112 smaller than, but similar in structure to, pouch 138 shown in FIGS. 5 and 6. Pouch 208 has three sides 210 at which cover 108 is attached to base layer 112. At edge 212 of pouch 208, however, no such bonding between cover 108 and base layer 112 has been effected. Consequently, cover 108 and base layer 112 form an opening at which lower surface 212 of cover 108 can be separated from upper surface 202 of base layer 212 to admit additional sheet material 140B into pouch 208.

Information display pad 200 also includes a tray 214 formed as an inset to base layer 112 at attachment site 204. Tray 214 can be usefully employed to retain desktop articles, such as paper clips, pencils, or adhesive note pads. Adjacent to tray 214 cover 208 has been provided with an erasable writing surface 216 upon which a user can temporarily enter notations with a writing implement.

Raising and lowering of portions of cover 108 remote from attachment site 204 permits ready rearrangement of sheet materials 140A retained thereunder. With cover 108 returned to a position resting on top of base layer 112, sheet materials 140A are firmly retained in place, preserved against displacement or degradation by activities conducted on top surface 216 of cover 108. As desired, top surface 215 may be textured in any manner best suited to the work to be conducted on information display pad 200. Thus, a properly textured surface 216 of cover 108 could render information display pad 200 useable not only as a desk pad, but also as a mouse operating pad. Information display pad 200 like the embodiment of the invention shown in FIGS. 5 and 6, is preferably fabricated from materials described in relation to mouse pad 100 shown in FIG. 2.

Figure 9:
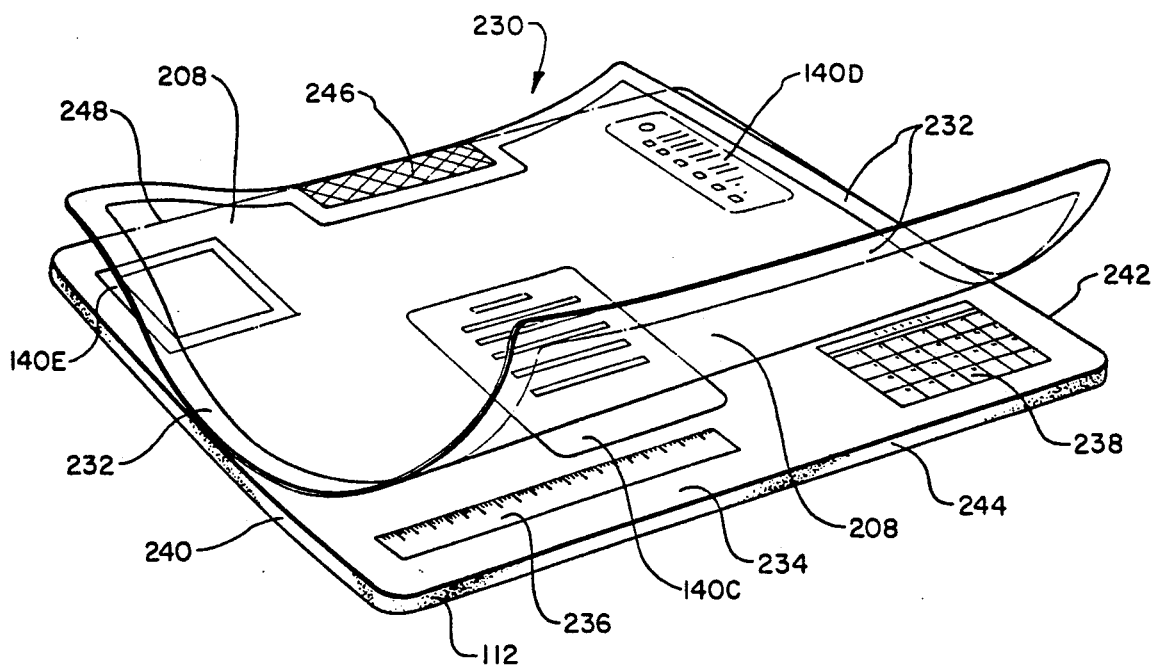
FIG. 9 is a third embodiment of an information display pad according to the present invention.

Yet another embodiment of an information display pad 230 incorporating teachings of the present invention is shown in FIG. 9 as comprising a base layer 112 and a thin transparent cover 108, both described previously. Optionally, cover 108 may be imprinted in part with visual information or graphic designs, shown for purposes of illustration in FIG. 9 as borders 232. Upper surface 234 of base layer 112 may be imprinted with visual information apprehendable by a user of information display pad 230 through transparent cover 108. As shown by way of example, such visual information on upper surface 234 of base layer 212 may take the form of a measuring scale 236 or a calendar 238.

In accordance with yet another aspect of the present invention, information display pad 230 is provided with three-way hinge means for attaching transparent cover 108 to base layer 112 and nevertheless permitting access to sheet material 140C, 140D, or 140E retained between transparent cover 108 and base layer 112 from any of opposed side edges 240, 242 of base layer 112, as well as from included bottom edge 244 thereof. As shown by way of illustration and not limitation, cover 108 is secured to base layer 112 at an attachment site 246 located at a medial position on top edge 248 of base layer 112. Accordingly, portions of cover 108 remote from attachment site 246 may be lifted from upper surface 234 of base layer 112 for this purpose. Specifically, this can occur at selected portions of an access perimeter defined as including at least opposed side edges 240, 242 of base layer 112 and bottom edge 244 thereof included between opposed side edges 240, 242. Because attachment site 246 extends along only a portion of top edge 248 of base layer 112, portions of cover 108 along top edge 248 remote from attachment site 246, as well as portions of cover 108 at included bottom edge 244 of base layer 112, are included within the access perimeter as these may be thusly manipulated to permit easy rearrangement of the sheet materials being displayed by information display pad 230.

The present invention thus provides a cover for a work surface which in addition permits the display and ready rearrangement of sheet material bearing visual information to which a user may require frequent reference. The present invention thus constitutes an apparatus by which the user of a work surface may carry out activities on a substitute work surface and on a selective basis obtain information from a plurality of articles of printed sheet material retained thereunder. In addition the upper surface of the thin transparent cover over such sheet materials can be provided with any desired physical qualities. Being isolated from anomalies in the work surface below, it can serve as an ideal substitute work surface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A pad for use on a work surface to display visual information on sheet material to a user of the work surface and to afford the user of the work surface a substitute work surface upon which to perform tasks, the pad comprising:

(a) a flexible base layer having upper and lower surfaces and being made of a resilient sponge material, said lower surface of said base layer configured to rest against and be non-destructively removable from the work surface;

(b) a gripping surface on said lower surface of said base layer textured to functionally hold said pad in place on the work surface;

(c) a flexible cover comprising a single thin transparent layer upheld by and congruent with said base layer, said cover having an upper surface configured to serve as the substitute work surface and on the opposite side therefrom a lower surface resting against said upper surface of said base layer to removably retain the sheet material between said base layer and said cover with visual information on the sheet material being visible through said cover to the user of the work station; and (d) an attachment site between said base layer and said cover at at least a portion of an edge of said base layer at which said lower surface of said cover is bonded directly to said upper surface of said base layer, partial portions of the periphery of said cover other than at said attachment site being capable due to the flexibility of said cover of being repeatedly and non-destructively lifted away from said upper surface of said base layer while said lower surface of said base layer rests against the work surface and while other portions of said periphery of said cover remain in contact with said upper surface of said base layer thereby to permit the user to selectively insert, rearrange, and remove the sheet material between said cover and said base layer.

2. An information display pad as recited in claim 1, wherein said attachment site is so configured and disposed as to create between said lower surface of said cover and said upper surface of said base layer a pouch for receiving the sheet material, said pouch opening at said edge of said base layer at which said attachment site is located.

3. An information display pad as recited in claim 1, wherein said upper surface of said cover layer is provided with an erasable writing surface disposed proximate to said edge of said base layer at which said attachment site is located.

4. An information display pad as recited in claim 1 comprising, a pouch formed between said cover and said base layer, said pouch having sides at which said cover is attached to said base layer and at least one opening at said edge of said base layer at which said attachment site is located and at which said lower surface of said cover can be separated from said upper surface of said base layer to admit the sheet material into said pocket means.

5. A pad as recited in claim 1, wherein said attachment site is located at a medial position on one edge of said base layer.

6. A pad as recited in claim 1, wherein said upper surface of said base layer is imprinted with graphic material visible through said cover layer by a user of said pad.

7. A pad as recited in claim 1, wherein said cover layer is imprinted with graphic designs.

8. A pad for use on a work surface to display visual information on sheet material, the pad comprising:

(a) a flexible base layer having upper and lower surfaces and being made of a resilient sponge material, said lower surface of said base layer being designed to rest against the work surface and be freely removable therefrom;

(b) a flexible thin transparent cover upheld by said base layer and having upper and lower surfaces, said upper surface of said cover serving as a substitute work surface and said lower surface thereof resting against said upper surface of said base layer to removably retain the sheet material between said base layer and said cover layer and to display the visual information to a user of said pad; and, (c) three-way hinge means located at a medial position on one edge of said base layer for attaching said cover to said base layer and permitting access to said sheet material by lifting said cover away from said upper surface of said base layer at selected portions of an access perimeter defined by at least two opposed edges of said base layer and an edge of said base layer included therebetween, whereby due to the flexibility of said cover, selected portions of the periphery of the cover other than at said three-way hinge means can be repeatedly and non-destructively lifted away from said upper surface of said base layer permitting access to said sheet material while other portions of the periphery of the cover remain in contact with said upper surface of said base layer.

* * * * *

UNITED STATES PATENT AND TRADEMARK OFFICE
CERTIFICATE OF CORRECTION

PATENT NO. : 5,022,170

DATED : June 11, 1991

INVENTOR(S) : V. Dean House

It is certified that error appears in the above-identified patent and that said Letters Patent is hereby corrected as shown below:

```
Column 1, line 33, after "thereon" insert --.--
Column 2, line 11, after "calendars" insert --,--
Column 2, line 11, after "tables" insert --,--
Column 2, line 38, before "comprised" insert --have been--
Column 5, line 24, "ethelene" should be --ethylene--
Column 5, line 41, "ethelene" should be --ethylene--
Column 6, line 2, "usefully also be" should be --also be usefully--
Column 6, line 28, "an" should be --and--
Column 6, lines 61-63, "The materials and method of manufacture
described earlier in relation to mouse operating pad 100 are appropriate
information display pad 180 also." should be --The materials and method of
manufacture described earlier in relation to mouse operating pad 100
are appropriate in relation to information display pad 180 also.--
Column 7, line 23, after "base layer 112" insert --.--
Column 8, line 45, after "In addition" insert --,--
```

Signed and Sealed this

Twenty-fifth Day of May, 1993

Attest:

MICHAEL K. KIRK

Attesting Officer

Acting Commissioner of Patents and Trademarks